(12) United States Patent
Alley

(10) Patent No.: US 9,228,905 B2
(45) Date of Patent: Jan. 5, 2016

(54) RTD MEASUREMENT DEVICE

(75) Inventor: Daniel Milton Alley, Earlysville, VA (US)

(73) Assignee: General Electric Company, Schenectady, NY (US)

( * ) Notice: Subject to any disclaimer, the term of this patent is extended or adjusted under 35 U.S.C. 154(b) by 614 days.

(21) Appl. No.: 13/590,395

(22) Filed: Aug. 21, 2012

(65) Prior Publication Data

US 2014/0056329 A1 Feb. 27, 2014

(51) Int. Cl.
*G01K 15/00* (2006.01)
*G01K 7/00* (2006.01)
*G01K 7/20* (2006.01)

(52) U.S. Cl.
CPC ................ *G01K 7/20* (2013.01); *G01K 15/007* (2013.01)

(58) Field of Classification Search
CPC ......... G01K 15/007; G01K 7/20; G01R 27/02
USPC ......... 374/E15.001, 1, 172, 180, 183; 702/58
See application file for complete search history.

(56) References Cited

U.S. PATENT DOCUMENTS

| 4,309,653 A | 1/1982 | Stack et al. |
| 5,317,520 A | 5/1994 | Castle |
| 5,519,644 A | 5/1996 | Benton |
| 6,244,744 B1 | 6/2001 | Calvin |
| 6,612,737 B1 | 9/2003 | Lobban |
| 7,124,041 B1 | 10/2006 | Johnson et al. |
| 7,367,712 B2 | 5/2008 | Becker et al. |
| 2005/0052274 A1* | 3/2005 | Mattoon et al. ................. 338/25 |
| 2008/0133170 A1 | 6/2008 | Engelstad |
| 2008/0279255 A1 | 11/2008 | Burmeister et al. |

OTHER PUBLICATIONS

Search Report and Written Opinion from corresponding PCT/US2013/051601 dated May 19, 2014.

* cited by examiner

*Primary Examiner* — Lisa Caputo
*Assistant Examiner* — Nasir U Ahmed
(74) *Attorney, Agent, or Firm* — Ernest G. Cusick; Hoffman Warnick LLC

(57) ABSTRACT

Aspects of the invention provide for a resistance temperature device (RTD) measurement device. In one embodiment, aspects of the invention include a RTD measurement device that includes: an input including a plurality of terminals from an RTD sensor; a plurality of burnout switches, each burnout switch connected to a terminal of the RTD sensor; a plurality of resources; and a switch block connecting the plurality of terminals and the plurality of resources to determine a measurement of the RTD sensor.

15 Claims, 6 Drawing Sheets

RTD MEASUREMENT DEVICE

BACKGROUND OF THE INVENTION

The subject matter disclosed herein relates generally to a resistance temperature device (RTD) measurement device. More particularly, the present disclosure related to a RTD measurement device including a switch block to determine wiring setup and wiring failures.

RTD sensors are temperature-sensing devices; therefore, the resistance of an RTD sensor increases with temperature. As seen in FIG. 1, a typical RTD sensor 10 includes 4 wires that may connect to a RTD measurement device 100. However, not all 4 wires are required to utilize the RTD sensor. A first configuration 1 shows a 4-wire configuration, where terminals A, B, C, and D of RTD measurement device 100 are connected to the RTD sensor 10. In a second configuration 2, an exemplary S-wire configuration is shown. In this second configuration 2, only A, B, and C terminals of RTD measurement device 100 are shown as connected. However, it is understood that a 3-wire configuration may include A, B, and D connected; A, C, and D connected; or B, C, and D connected. In a third configuration 3, an exemplary 2-wire configuration is shown. In this third configuration 3, only A and C terminals of RTD measurement device 100 are shown as connected. However, it is understood that a 2-wire configuration may include A and D connected; B and D connected; or B and C connected. In other words, at least one terminal on either side of the RTD sensor 10 must be connected to the RTD measurement device in order to measure the resistance across RTD sensor 10.

Regardless of the type of wiring configuration, at times, there may be poor connections on any of the terminals wires, which can lead to measurement errors.

BRIEF DESCRIPTION OF THE INVENTION

Aspects of the invention provide for a RTD measurement device. In one embodiment, aspects of the invention include a RTD measurement device that includes: an input including a plurality of terminals from an RTD sensor; a plurality of burnout switches, each burnout switch connected to a terminal of the RTD sensor; a plurality of resources; and a switch block connecting the plurality of terminals and the plurality of resources to determine a measurement of the RTD sensor.

A first aspect of the invention provides an apparatus, comprising: an RTD sensor; a processor; and an RTD measurement device coupled to the RTD sensor and configured to receive settings from the processor, wherein the RTD measurement device comprises: an input including a plurality of terminals from the RTD sensor; a plurality of burnout switches, each burnout switch connected to a terminal of the RTD sensor; a plurality of resources; and a switch block connecting the plurality of terminals and the plurality of resources to determine a measurement of the RTD sensor.

A second aspect of the invention provides a system, comprising: an RTD sensor; a processor; and an RTD measurement device coupled to the RTD sensor and configured to receive settings from the processor, wherein the RTD measurement device comprises: an input including a plurality of terminals from the RTD sensor; a plurality of burnout switches, each burnout switch connected to a terminal of the RTD sensor; a plurality of resources; and a switch block connecting the plurality of terminals and the plurality of resources to determine a measurement of the RTD sensor.

A third aspect of the invention provides a method of operating an RTD measurement device, the method comprising: determining a type of wiring setup for an RTD sensor coupled to the RTD measurement device, the determining including verifying a wiring for each terminal of the RTD sensor using a switch block connected to a plurality of resources; measuring a first channel of an output of the RTD measurement device; measuring a second channel of the output of the RTD measurement device; and determining resistance of the RTD sensor, based on the measurement of the first channel and the measurement of the second channel.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Various embodiments of the present invention are directed to a RTD measurement device that determines a type of wiring configuration for a RTD sensor, and also determines if there are any poor connections. In the case that a poor connection exists, the RTD measurement device can reassign the wiring connections to continue to use the RTD sensor. In these embodiments, the RTD measurement device includes a switch block for determining if there are any poor connections and for reassigning the wiring connections. Technical effects associated with the various embodiments of the present invention allow for a single RTD measurement device to be used for any RTD sensor, regardless of wiring configuration, and also for determining poor connections in the wiring configurations and reassigning the wiring connections so that the RTD sensor can still be used.

Figure 1:
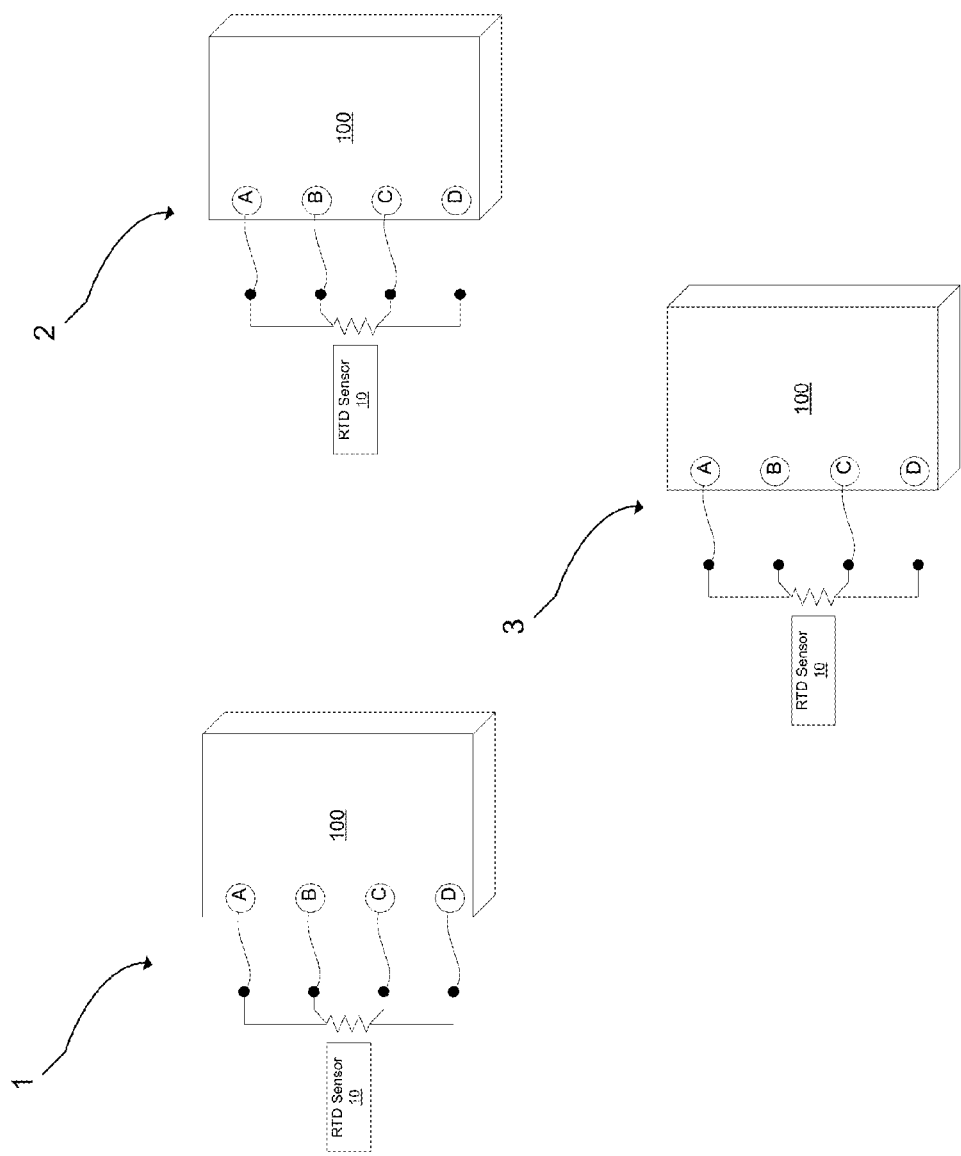
FIG. 1 shows a several wiring configurations between a RTD sensor and a RTD measurement device according to embodiments of the invention.
Figure 2:
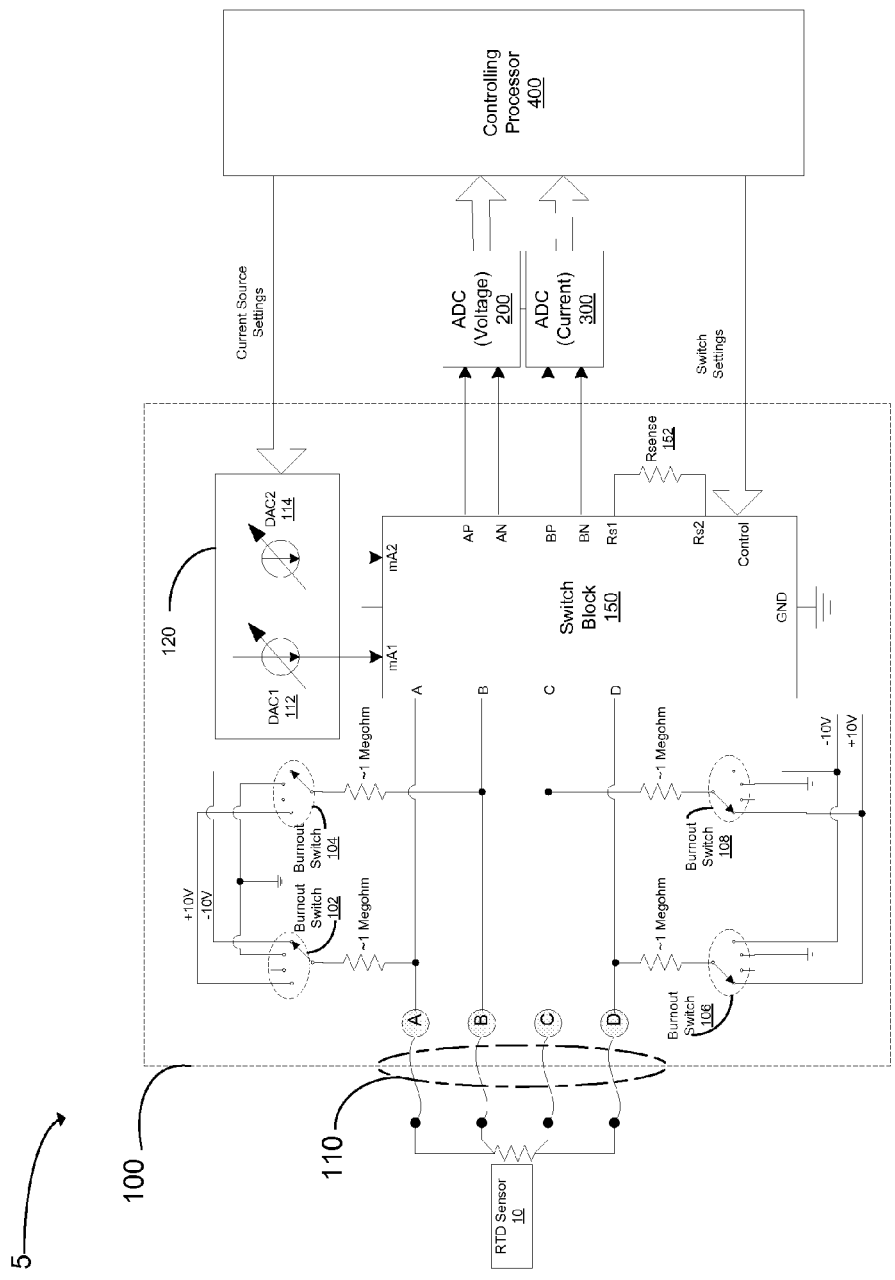
FIG. 2 shows a detailed schematic diagram of a system including a RTD sensor and a RTD measurement device according to embodiments of the invention.

Referring now to the drawings, FIG. 1 shows a detailed schematic diagram of a system 5 including a RTD sensor 10 and a RTD measurement device 100 according to embodiments of the invention. Although all four wires of RTD sensor 10 are shown as connected to terminals A, B, C, and D of RTD measurement device 100, it is understood that RTD sensor 10 may include any wiring configuration (i.e., 4-wire, 3-wire, or 2-wire configuration).

RTD measurement device 100 includes an input 110 including a plurality of terminals (terminal A, B, C, and D) from RTD sensor 10. As mentioned above, with respect to FIG. 1, it is understood that RTD sensor 100 may include any wiring configuration; however, at least one wire on each side of the resistor of RTD sensor 10 must be connected in order to measure the resistance of the RTD sensor 10.

RTD measurement device 100 also includes a plurality of burnout switches 102, 104, 106, 108 that are each connected to a terminal A, B, C, D of the RTD measurement device 100. For example, burnout switch 102 is connected to terminal A; burnout switch 104 is connected to terminal B, burnout switch 106 is connected to terminal D; and burnout switch 108 is connected to terminal C. Between each switch 102, 104, 106, 108 and the connected to the respective terminal A, B, C, D is a resistor that is approximately 1 Megaohm. Each burnout switch 102, 104, 106, 108 is able to switch between four different connections: +10V, −10V, ground, or an open switch. As will be described herein, these burnout switches 102, 104, 106, 108 are used to verify the wiring of the RTD sensor 10 in order to determine the wiring configuration of RTD sensor 10, and to also detect faulty wiring in that wiring configuration or determine the resistance of the RTD sensor 10.

RTD measurement device 100 also includes a plurality of resources 120, such as current source DAC1 112 and current source DAC2 114. RTD measurement device 100 further includes a switch block 150 that connects the plurality of terminals A, B, C, D and the plurality of resources 120 to determine a measurement of the RTD sensor 10. Also shown in RTD measurement device 100 is a sensing resistor Rsense 152.

As will be described in FIGS. 4-6, current sources 112, 114 receive current source settings from a controlling processor 400 and switch block 150 receives switch settings from controlling processor 400. Switch settings indicate the proper connections for burnout switches 102, 104, 106, 108 and also the proper connections within switch block 150.

The output of RTD measurement device 100 is a first channel 200 (ADC Voltage) and a second channel 300 (ADC Current). This output is sent to the controlling processor 400 in order to determine the wiring configuration of the RTD sensor 10, the resistance of RTD sensor 10, and/or the existence of any faulty wiring between the RTD sensor 10 and the RTD measurement device 100.

Figure 3:
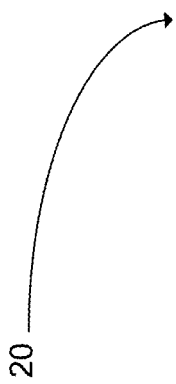
FIG. 3 shows a record of data used by a RTD measurement device according to embodiments of the invention.

Turning now to FIG. 3, a record of data 20 used by the RTD measurement device 100 according to embodiments of the invention is shown. The record of data 20, as shown, includes 6 bits of data. The first bit 22 (i.e., "Bit 0", the lowest bit) records if terminal A is connected to RTD sensor 10. The second bit 24 ("Bit 1") records if terminal B is connected to RTD sensor 10. The third bit 26 ("Bit 2") records if terminal C is connected to RTD sensor 10. The fourth bit 28 ("Bit 3") records if terminal D is connected to RTD sensor 10. The fifth and sixth bit 30, 32 ("Bit 4" and "Bit 5") record if the first channel 200 and the second channel 300, respectively, are verified. As will be described later herein, this record of data 20 will be referred to herein as "BAD_IOPIN." It is understood that, at initialization (i.e. "Start"), this record of data 20 ("BAD_IOPIN") is set to no value ("BAD_IOPIN=0x0").

For exemplary purposes only, in the example described later herein, the command "BAD_IOPIN+=0x1" records an open connection between RTD sensor 10 and terminal A of the RTD measurement device 100. That is, the first bit 22 of the record of data 20 is set to "1." The command "BAD_IOPIN+=0x2" records an open connection between RTD sensor 10 and terminal B of the RTD measurement device 100. The second bit 24 of the record of data 20 is set to "1." The command "BAD_IOPIN+=0x4" records an open connection between RTD sensor 10 and terminal C of the RTD measurement device 100. The third bit 26 of the record of data 20 is set to "1." The command "BAD_IOPIN+=0x8" records an open connection between RTD sensor 10 and terminal C. The fourth bit 30 of the record of data is set to "1." The command "BAD_IOPIN+=0x10" and "BAD_IOPIN+=0x20" record that the first channel 200 and the second channel 300 are not operating correctly. That is, the fifth bit 32 and the sixth bit 34 of the record of data are set to "1."

Figure 4:
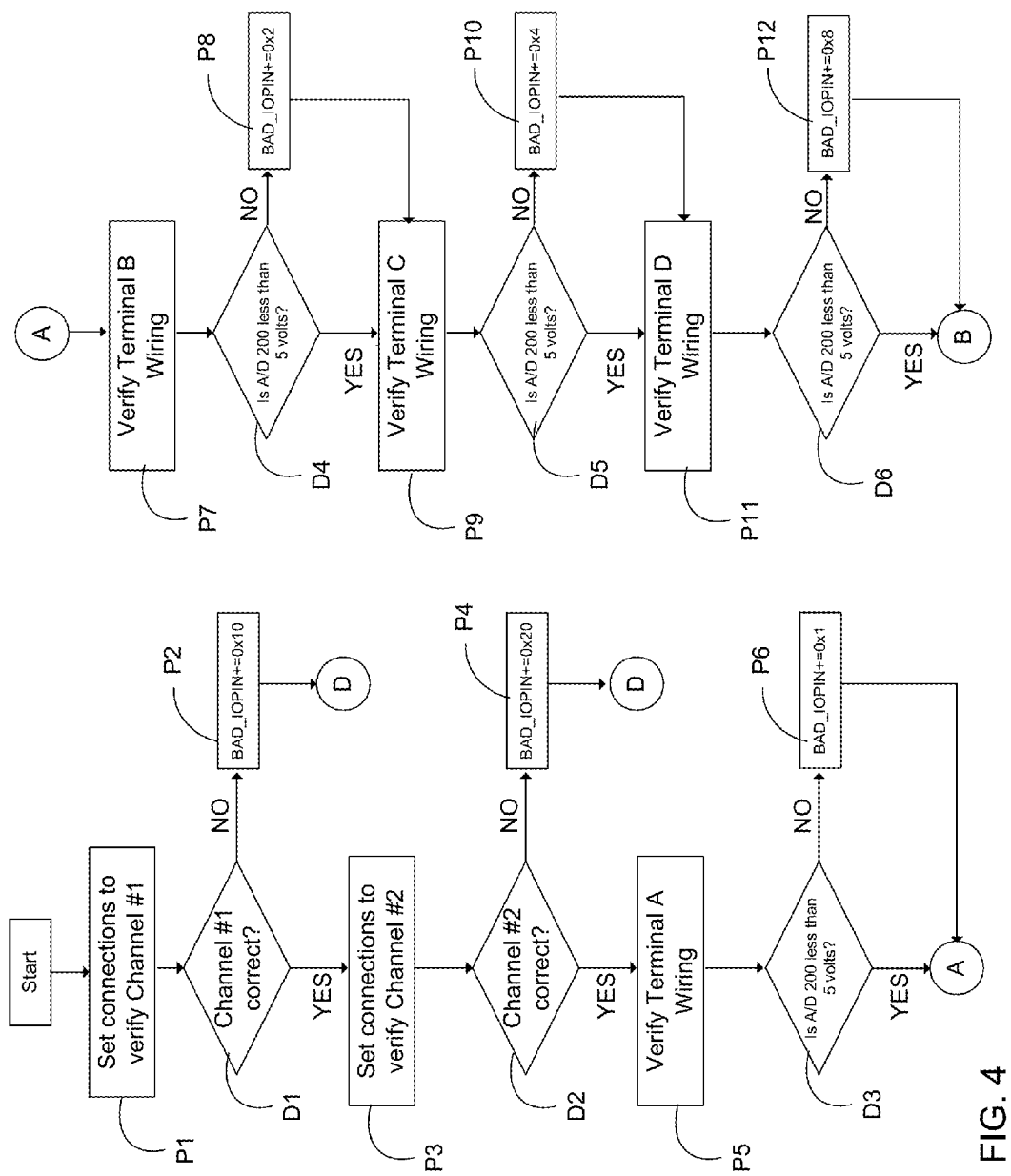
FIG. 4 shows a flow diagram of an operational methodology for a system according to embodiments of the invention.
Figure 5:
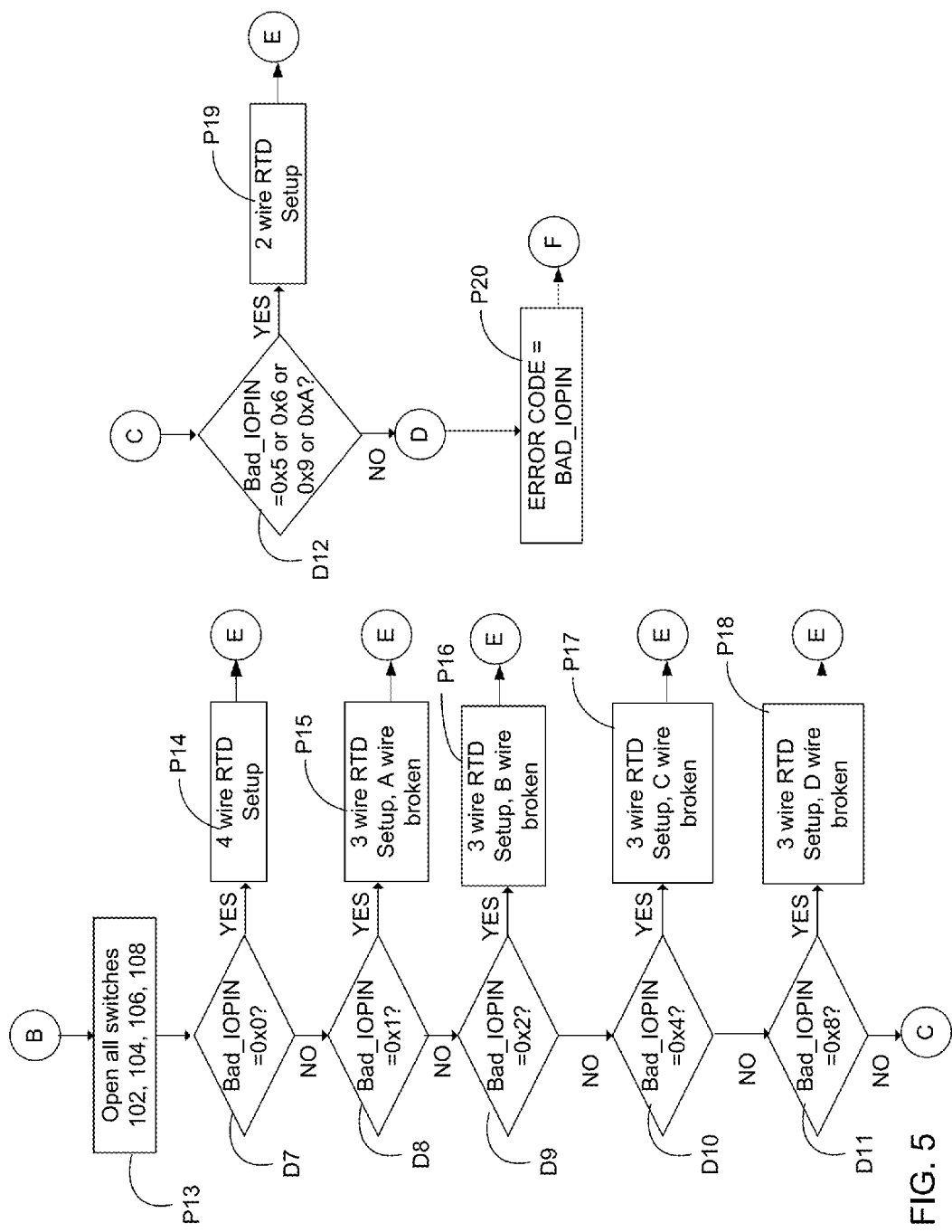
FIG. 5 shows a flow diagram of an operational methodology for a system according to embodiments of the invention.
Figure 6:
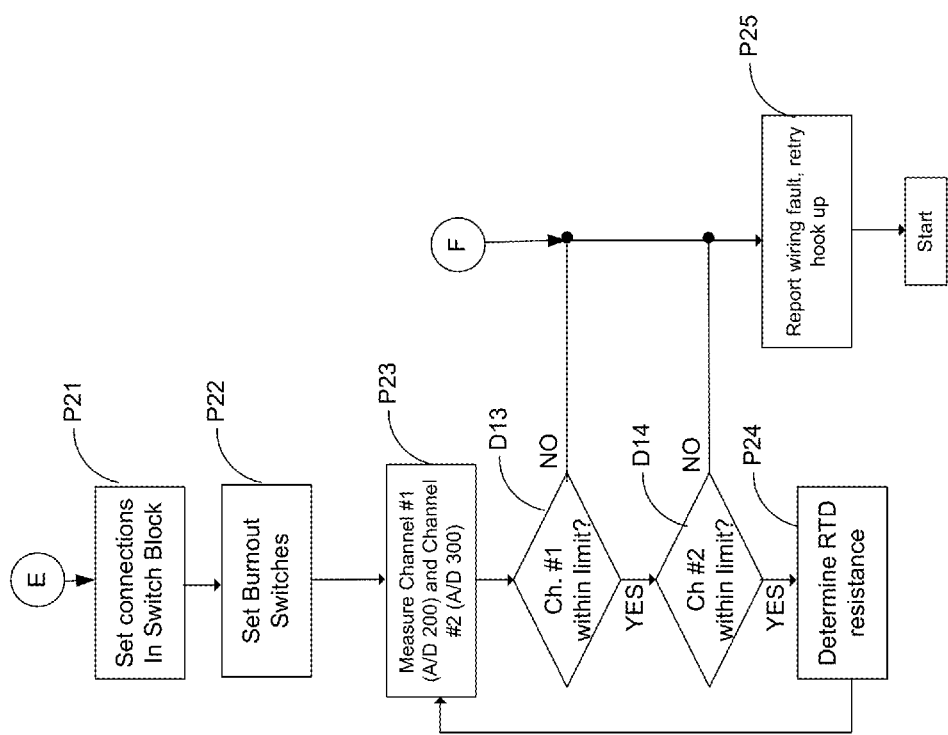
FIG. 6 shows a flow diagram of an operational methodology for a system according to embodiments of the invention.

Turning now to FIGS. 4-6 and with regard to the system 5 shown in FIG. 3, a flow diagram of an operational methodology for a system according to embodiments of the invention is shown. The description below of the operational methodology of operating RTD measurement device 100 is not limited by the specific values provided herein. It is understood that these values are for exemplary purposes only, and are not intended to limit the invention.

Initially, the first channel 200 and the second channel 300 of the output of the RTD measurement device 100 are verified. To verify the first channel 200 and second channel 300, at process P1, connections are set to verify the first channel 200. That is, controlling processor 400 generates current source settings for the current sources 112, 114 and switch settings for the switch block, accordingly. For example, the first current source 112 (DAC1) will be set for 1 milliamp (mA). Within switch block 150, the first current source 112 (DAC1) is connected to "Rs1" of sensing resistor 152 and "AP" for the first channel 200. This connection provides the current from the first current source 112 (DAC1) to the sensing resistor 152. Further, ground "GND" of switch block 150 is connected to "Rs2" of sensing resistor 152 and "AN" for the first channel 200. This connection sends the current through the sensing resistor 152 to ground.

At D1, the output of the first channel 200 is verified to determine if it is the correct value, based on the current provided by the first current source 112 (DAC1) and the value of the sensing resistor 152. If the output at the first channel 200 is not correct, "NO" at D1, the processor 400 sets, at P2, the record of data 20 accordingly ("BAD_IOPIN+=0x10"). At this point, processor 400 will generate an error code.

If the first channel 200 is correct, "YES" at D1, then connections are set to verify the second channel 300 (P3). At P3, to verify the second channel 300, connects are set. For example, the second current source 114 (DAC2) is set to 2 mA. The second current source 114 (DAC2) is connected to "Rs1" of sensing resistor 152 and "BP" for the second channel 300. Further, "GND" of switch block 150 is connected to "Rs2" of sensing resistor 152 and "BN" of second channel 300. Similar to the connections set for the first channel 200, these connections provide the current through sensing resistor 152 to ground.

At D2, the output of the second channel 300 is verified to determine if it is the correct value, based on the current provided by the second current source 114 (DAC2) and the value of the sensing resistor 152. If the output at the second channel 300 is not correct, "NO" at D2, the processor 400 sets, at P4, the record of data 20 accordingly ("BAD_IOPIN+= 0x20"). At this point, processor 400 will generate an error code.

If the output at the second channel 300 is correct, "YES" at D2, the type of wiring setup/configuration for the RTD sensor 10 (4-wire, 3-wire with either terminal A, B, C, or D broken, or a 2-wire setup) is determined. In order to determine the type of wiring setup/configuration, the wiring for each terminal in the RTD measurement device 100 is verified. At P5, the wiring at terminal A is verified. In order to verify the wiring at terminal A, processor 400 sends switch settings to the switch block 150. For example, to verify the wiring at terminal A, the switch settings will set the first burnout switch 102 to +10V and burnout switches 104, 106, 108 are set to −10V. In switch block 150, terminal A is connected to "AP" and "GND" is connected to "AN." This connection checks terminal A with respect to ground. At D3, the output of the first channel 200 is checked to determine if terminal A is open (or is a broken wire). If terminal A is open or is a broken wire, the output at the first channel 200 should be close to +10V, and, at P6, the processor sets the record of data 20 accordingly ("BAD_IOPIN+=0x1"). However, if terminal A is properly connected to RTD sensor 10, the output at the first channel 200 should be less than +10V. For example, the output at the first channel 200 should be less than 5V.

At P7, the wiring at terminal B is verified. Similar to the connections to verify the wiring at terminal A, the second burnout switch 104 (i.e., the burnout switch connected to the terminal being verified) is set to +10V, while the other burnout switches are set to −10V. The terminal being verified (terminal B) is connected to "AP," while "AN" is connected to "GND." At D4, the output at the first channel 200 is checked to determine if terminal B is properly connected (output at first channel 200 is less than, for example, 5V). If "NO," then at P8, the processor 400 sets the record of data 20 accordingly ("BAD_IOPIN+=0x2"). If "YES," then the wiring at terminal C is verified.

At P9, to verify the wiring at terminal C, burnout switch 106 is set to +10V, and burnout switches 102, 104, 108 are set to −10V. Terminal C is connected to "AP" and "AN" is connected to "GND." At D5, the output at the first channel 200 is checked to determine if terminal C is properly connected (e.g., the output at the first channel 200 is less than, for example, 5V). If "NO," then at P10, the processor 400 sets the record of data 20 accordingly ("BAD_IOPIN+=0x4"). If "YES," then the wiring at terminal D is verified.

At P11, to verify the wiring at terminal C, burnout switch 108 is set to +10V, and burnout switches 102, 104, 106 are set to −10V. Terminal D is connected "AP" and "AN" is connected to "GND." At D6, the output at the first channel 200 is checked to determine if terminal D is properly connected (e.g., the output at the first channel 200 is less than, for example, 5V). If "NO," then at P12, the processor 400 sets the record of data 20 accordingly ("BAD_IOPIN+=0x8"). At this point, all the terminals in the RTD measurement device 100 have been verified, and type of wiring for the RTD sensor 10 may be determined based on the record of data 20.

At P13, all of the burnout switches 102, 104, 106, 108 are opened. At D7, the processor 400 determines if the "BAD_IOPIN=0x0." If "YES," then, at P14, all four terminals (A,B,C,D) are properly connected and RTD sensor 10 is a 4-wire setup/configuration. If "NO," then the processor 400 determines at D8 if "BAD_IOPIN=0x1." If "YES," then, at P15, the processor 400 determines that RTD sensor 10 is a 3-wire RTD configuration with A terminal open. At D9, the processor 400 determines if "BAD_IOPIN=0x2." If "YES," then at P16, the processor 400 determines that RTD sensor 10 is a 3-wire RTD configuration with B terminal open. At D10, the processor 400 determines if "BAD_IOPIN=0x4." If "YES," then at P17, the processor 400 determines that RTD sensor 10 is a 3-wire RTD configuration with C terminal open. At D11, the processor 400 determines if "BAD_IOPIN=0x8." If "YES," then at P18, the processor 400 determines that RTD sensor 10 is a 3-wire RTD configuration with D terminal open.

At D12, the processor determines if "BAD_IOPIN=0x5 or 0x6 or 0x9 or 0xA." If "YES," then the processor determines that RTD sensor 10 is a proper 2-wire RTD configuration, with at least one terminal connected on either side of the resistor of RTD sensor 10. "BAD_IOPIN=0x5" means that terminal A and terminal C are open (only terminal B and terminal D are properly connected). "BAD_IOPIN=0x6" means that terminal B and terminal C are open (terminal A and terminal D are properly connected). "BAD_IOPIN=0x9" means that terminal A and terminal D are open (terminal B and terminal C are properly connected). "BAD_IOPIN=0xA" means that terminal B and terminal D are open (terminal A and terminal C are properly connected).

However, if "NO" at D12, then the processor 400 generates an error code at P20 because RTD sensor 10 is not properly connected to the RTD measurement device 100. At P25, a wiring fault is reported and the process may begin again.

Once the type of wiring for RTD sensor 10 is determined, the output of the RTD measurement device 10 at the first channel 200 and the second channel 300 are measured in order to determine the resistance of the RTD sensor. In order to measure the output at the first channel 200 and the second channel 300 properly, the processor 400 sends current source settings and switch settings to the current sources 112, 114 and the switch block, respectively.

That is, at P21 and P22, the connections are set in the switch block and the burnout switches, based on the setting provided by the processor 400. The connections are set such that currents from the first and second current sources 112, 114 are routed through the resistance of the RTD sensor 10 while the first channel and second channel 200,300 are connected to measure the voltage and current for the resistance. There are sufficient switches within the switch block 150 to allow this routing to occur for the various combinations of connections, with FIG. 5 showing detection of six connection settings. Once connected, the processor begins the measurement loop, as described herein.

At P23, the output at the first channel and the second channel are measured. At D13, the processor 400 determines whether the output at first channel 200 is within the specified limit, and at D14, the processor determines whether the output at the second channel 300 is within the specified limit. If "YES," the resistance of the RTD sensor is determined based upon the output of the first channel 200 and the output of the second channel. The processor 400 will repeat the measurements of the first channel 200 and the second channel 300 to have a real-time value for the resistance of the RTD sensor 10, until the output of either the first channel 200 or the second channel 300, or both, are no longer within the specified limit. At that point, at P25, processor 400 reports a wiring fault, and processor 400 will run through the process again to determine the proper wiring configuration.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A resistance temperature device (RTD) measurement device, comprising:
   an input including a plurality of terminals from an RTD sensor;
   a plurality of burnout switches, each burnout switch connected to a terminal of the RTD sensor, wherein each of the plurality of burnout switches can provide a first voltage and a second voltage to the RTD sensor;
   a plurality of resources including a first current source for providing a first current to the RTD sensor and a second current source for providing a second current to the RTD sensor;
   a switch block connecting the plurality of terminals and the plurality of resources to determine a measurement of the RTD sensor, wherein the switch block is configured to provide;
   a first output channel measuring the first voltage of the RTD sensor and the first current of the RTD sensor based on the first current provided to the RTD sensor;
   a second output channel measuring the second voltage of the RTD sensor and the second current of the RTD sensor based on the second current provided to the RTD sensor; and
   a processor for determining whether the first voltage of the RTD sensor and first current of the RTD sensor are within a specified limit and if not, reporting a wiring fault and determining whether the second voltage of the RTD sensor and second current of the RTD sensor are within the specified limit and if not, reporting a wiring fault.

2. The RTD measurement device of claim 1, wherein the RTD sensor includes one of the following: a 4-wire sensor, a 3-wire sensor, or a 2-wire sensor.

3. The RTD measurement device of claim 2, wherein, in response to a 4-wire sensor including a broken wire, the switch block is configured to connect the plurality of terminals and the plurality of resources, such that the RTD sensor operates as a 3-wire sensor.

4. The RTD measurement device of claim 2, wherein, in response to a 3-wire sensor including a broken wire, the switch block is configured to connect the plurality of terminals and the plurality of resources, such that the RTD sensor operates as a 2-wire sensor.

5. The RTD measurement device of claim 1, wherein the plurality of resources further includes a sensing resistor.

6. A system, comprising:
   a resistance temperature device (RTD) sensor;
   a processor; and
   an RTD measurement device coupled to the RTD sensor and configured to receive settings from the processor, wherein the RTD measurement device comprises:
      an input including a plurality of terminals from the RTD sensor;
      a plurality of burnout switches, each burnout switch connected to a terminal of the RTD sensor, wherein each of the plurality of burnout switches can provide a first voltage and a second voltage to the RTD sensor;
      a plurality of resources including a first current source for providing a first current to the RTD sensor and a second current source for providing a second current to the RTD sensor;
      a switch block connecting the plurality of terminals and the plurality of resources to determine a measurement of the RTD sensor, wherein the switch block is configured to provide;
      a first output channel measuring the first voltage of the RTD sensor and the first current of the RTD sensor based on the first current provided to the RTD sensor;
      a second output channel measuring the second voltage of the RTD sensor and the second current of the RTD sensor based on the second current provided to the RTD sensor; and
      a processor for determining whether the first voltage of the RTD sensor and first current of the RTD sensor are within a specified limit and if not, reporting a wiring fault and determining whether the second voltage of the RTD sensor and second current of the RTD sensor are within the specified limit and if not, reporting a wiring fault.

7. The system of claim 6, wherein the RTD sensor includes one of the following: a 4-wire sensor, a 3-wire sensor, or a 2-wire sensor.

8. The system of claim 7, wherein, in response to a 4-wire sensor including a broken wire, the switch block is configured to connect the plurality of terminals and the plurality of resources, such that the RTD sensor operates as a 3-wire sensor.

9. The system of claim 7, wherein, in response to a 3-wire sensor including a broken wire, the switch block is configured to connect the plurality of terminals and the plurality of resources, such that the RTD sensor operates as a 2-wire sensor.

10. The system of claim 7, wherein the plurality of resources further includes a sensing resistor.

11. The system of claim 6, wherein the RTD measurement device further comprises an output including a first channel and a second channel, wherein the measurement of the RTD sensor is based on the output.

12. A method of operating a resistance temperature device (RTD) measurement device, the method comprising:
   determining a type of wiring setup for an RTD sensor coupled to the RTD measurement device, the determining including verifying a wiring for each terminal of the RTD sensor using a switch block connected to a plurality of resources including a first current source for providing a first current to the RTD sensor and a second current source for providing a second current to the RTD sensor;
   providing a first voltage to the RTD sensor from a plurality of burnout switches,
   providing a second voltage to the RTD sensor from the plurality of burnout switches,
   providing a switch block connecting the wiring of each terminal of the RTD sensor and the plurality of resources, wherein the switch block is configured for:
   providing the first current to the RTD sensor from the first current source;
   measuring a first channel of an output of the RTD measurement device wherein in response to the first channel output, determining whether the first channel output is outside a specified limit and reporting an error;
   providing the second current to the RTD sensor from the second current source;
   measuring a second channel of the output of the RTD measurement device wherein in response to the second channel output, determining whether the second channel output is outside the specified limit and reporting an error; and determining resistance of the RTD sensor, based on the measurement of the first channel and the measurement of the second channel.

13. The method of claim 12, further comprising determining if the measurement of the first channel is within a specified limit.

14. The method of claim 12, further comprising, prior to determining the type of wiring setup, verifying the first channel and the second channel of the output of the RTD measurement device.

15. The method of claim 12, further comprising setting connections and switches in the RTD measurement device based on the type of wiring setup.

* * * * *